(12) United States Patent
Han

(10) Patent No.: US 11,384,837 B2
(45) Date of Patent: Jul. 12, 2022

(54) OIL RING FOR INTERNAL COMBUSTION ENGINE AND PISTON ASSEMBLY INCLUDING THE SAME

(71) Applicant: SAMYOUNG MACHINERY CO., LTD., Gongju-si (KR)

(72) Inventor: Geum Tai Han, Daejeon (KR)

(73) Assignee: SAMYOUNG MACHINERY CO., LTD., Gongju-si (KR)

( * ) Notice: Subject to any disclaimer, the term of this patent is extended or adjusted under 35 U.S.C. 154(b) by 0 days.

(21) Appl. No.: 16/962,882

(22) PCT Filed: Feb. 7, 2020

(86) PCT No.: PCT/KR2020/001742
§ 371 (c)(1),
(2) Date: Jul. 17, 2020

(87) PCT Pub. No.: WO2020/162702
PCT Pub. Date: Aug. 13, 2020

(65) Prior Publication Data
US 2021/0381596 A1 Dec. 9, 2021

(30) Foreign Application Priority Data
Feb. 7, 2019 (KR) .................... 10-2019-0014604

(51) Int. Cl.
*F16J 9/20* (2006.01)
(52) U.S. Cl.
CPC ............... *F16J 9/206* (2013.01); *F16J 9/203* (2013.01)
(58) Field of Classification Search
CPC ............... F16J 9/20; F16J 9/203; F16J 9/206
See application file for complete search history.

(56) References Cited

U.S. PATENT DOCUMENTS

| 1,567,452 | A | * | 12/1925 | Mummert | ................ | F16J 9/203 |
| | | | | | | 277/463 |
| 2,031,341 | A | * | 2/1936 | Stumpf | .................... | F16J 9/063 |
| | | | | | | 277/457 |

(Continued)

FOREIGN PATENT DOCUMENTS

| JP | H 02116115 U | 9/1990 |
| JP | H 0473653 U | 6/1992 |

(Continued)

OTHER PUBLICATIONS

WO, International Search Report dated Jul. 30, 2020.

*Primary Examiner* — Nicholas L Foster
(74) *Attorney, Agent, or Firm* — Li & Cai Intellectual Property (USA) Office

(57) ABSTRACT

Provided are an oil ring for an internal combustion engine and a piston assembly including the same, in which the oil ring for an internal combustion engine includes: a compression portion protruding from an upper portion of a body, in close contact with a cylinder inner wall and effectively limiting explosive gas generated in a combustion chamber; a scraper portion protruding from a lower portion of the body, in close contact with the cylinder inner wall and including a nose scraping off oil oversupplied to cylinder inner wall; and an oil suction portion being a space formed between the compression portion and the scraper portion to collect and discharge the oil oversupplied to cylinder inner wall, thereby reducing leakage of high-temperature and high-pressure gas generated in the combustion chamber, and preventing incomplete combustion caused by oil leaked into the combustion chamber.

13 Claims, 8 Drawing Sheets

(56) References Cited

U.S. PATENT DOCUMENTS

| | | | | |
|---|---|---|---|---|
| 2,037,984 | A * | 4/1936 | Johnson | F16J 9/206 |
| | | | | 277/462 |
| 2,424,881 | A * | 7/1947 | Fall | F16J 9/063 |
| | | | | 277/473 |
| 3,326,561 | A * | 6/1967 | Braendel | F16J 9/063 |
| | | | | 277/472 |
| 3,623,739 | A * | 11/1971 | Sugahara | F16J 9/203 |
| | | | | 277/463 |
| 6,651,606 | B2 * | 11/2003 | Han | F16J 9/062 |
| | | | | 123/193.6 |
| 6,675,762 | B2 * | 1/2004 | Han | F16J 1/09 |
| | | | | 123/193.6 |
| 9,506,138 | B2 * | 11/2016 | Sugiura | F16J 9/20 |
| D881,958 | S * | 4/2020 | Han | D15/148 |
| 10,883,600 | B2 * | 1/2021 | Mittler | F16J 9/206 |
| 2003/0079709 | A1 * | 5/2003 | Han | F16J 9/062 |
| | | | | 123/193.6 |
| 2003/0154947 | A1 * | 8/2003 | Han | F16J 1/09 |
| | | | | 123/193.6 |
| 2013/0154196 | A1 * | 6/2013 | Sytsma | F16J 9/00 |
| | | | | 277/434 |
| 2013/0328274 | A1 * | 12/2013 | Sugiura | C23C 14/16 |
| | | | | 277/444 |
| 2015/0225836 | A1 * | 8/2015 | Sugiura | F16J 9/20 |
| | | | | 427/528 |
| 2019/0178380 | A1 * | 6/2019 | Mittler | F16J 9/06 |

FOREIGN PATENT DOCUMENTS

| | | |
|---|---|---|
| JP | H0558858 A | 3/1993 |
| JP | H 0842693 A | 2/1996 |
| JP | 2002332590 A | 11/2002 |
| JP | 2006145027 A | 6/2006 |
| JP | 2011058373 A | 3/2011 |
| JP | 2014526019 A | 10/2014 |
| KR | 10-2003-0035268 A | 5/2003 |
| KR | 20-0374751 Y1 | 2/2005 |
| KR | 100475817 B1 | 3/2005 |
| KR | 10-1570998 B1 | 11/2015 |
| KR | 10-1677169 B1 | 11/2016 |

* cited by examiner

OIL RING FOR INTERNAL COMBUSTION ENGINE AND PISTON ASSEMBLY INCLUDING THE SAME

TECHNICAL FIELD

The present disclosure relates to an oil ring for an internal combustion engine and a piston assembly including the same, and more particularly, to an oil ring for an internal combustion engine, which may perform functions of a compression ring and a scraper ring, and a piston assembly including the same.

BACKGROUND ART

An internal combustion engine refers to an engine obtaining energy by exploding a fuel-air mixture in which fuel and air are mixed with each other in a combustion chamber. An explosion generated by the fuel-air mixture in the combustion chamber may generate high-temperature and high-pressure exhaust gas, and here, the internal combustion engine may obtain energy from power of the fuel-air mixture exploded in the combustion chamber. The energy obtained by the explosion may allow a piston, which is brought into contact with and slidably coupled to a cylinder inner wall inside the cylinder, to rotate a crankshaft in a crankcase, thereby allowing the internal combustion engine to obtain power.

Oil circulating in the internal combustion engine may serve to discharge heat generated between mechanical components of the internal combustion engine and reduce friction between the components. In particular, the oil may be supplied from the crankcase to the inside of the cylinder and spread or supplied to the cylinder inner wall. The oil supplied to the cylinder inner wall may reduce friction between the cylinder inner wall and the piston, and may help air-tightness between the piston and the cylinder inner wall. However, the air-tightness between the cylinder inner wall and the piston may be incomplete with only the piston and oil alone due to the friction generated between large contact area of the piston and the cylinder inner wall, resulting in the reduced efficiency of the internal combustion engine. Therefore, a piston assembly may be used in which a ring groove is formed on the piston and at least one piston ring is coupled thereto. The piston ring may prevent, through the air-tightness with the cylinder inner wall, a blow-by phenomenon, in which the high-temperature and high-pressure exhaust gas generated in the combustion chamber of the internal combustion engine is leaked in a direction toward the crankcase, and an incomplete combustion phenomenon, in which the fuel-air mixture and engine oil supplied to the combustion chamber are incompletely combusted due to the engine oil leaked into the combustion chamber. Furthermore, the piston ring included in the piston assembly may function to: transfer combustion heat received by the piston to the wall of the cylinder; reduce the friction between the piston assembly and the cylinder inner wall during a stroke of the internal combustion engine by allowing the engine oil spread on the cylinder inner wall to form a thin oil film on the cylinder inner wall; and discharge oil remaining after forming the oil film on the cylinder inner wall to a crankcase and manage the oil. The piston ring included in the piston assembly, which may prevent the blow-by phenomenon, prevent the incomplete combustion of the fuel-air mixture supplied to the combustion chamber through the oil control, and transfer the combustion heat received by the piston to the wall of the cylinder, may be classified into several types based on its function as follows.

A first type is a compression ring. The compression ring may function to maintain the air-tightness in such a manner that at least one compression ring is mounted on a compression ring groove positioned close to the combustion chamber of the piston assembly, and thereby the piston and the cylinder are brought into close contact with each other, and may function to transfer the combustion heat received by the piston to the wall of the cylinder. A second type is an oil ring. The oil ring may be mounted in a ring groove formed below the compression ring groove of the piston assembly to form the oil film on the cylinder inner wall and discharge engine oil oversupplied to the cylinder inner wall into the crankcase to control the oil. A third type is a scraper ring. The scraper ring may be mounted in a ring groove formed in the piston assembly or made by forming a portion of the compression ring in a shape of the scraper ring, and may serve to scrape off the engine oil oversupplied to the cylinder inner wall.

Korean Patent No. 10-0475817 (entitled "Oil ring mounting apparatus of piston" and published on Mar. 10, 2005) discloses a conventional oil ring and a piston assembly. To Briefly explain prior document 1 with reference to FIG. 1, as shown in FIG. 1, the apparatus has a structure configured to include a conventional piston 10 mounted in a cylinder of an internal combustion engine and having a reciprocating motion, wherein a ring groove 11 in which a piston ring is mounted is formed in the piston, a conventional oil hole 13 is formed in case that a conventional oil ring 12 is mounted therein, and oil scraped off from the inside of the cylinder is guided to the conventional oil hole 13 formed in the piston 10. The oil ring for an internal combustion engine and the piston assembly utilizing prior document 1 may have several problems as follows.

A common internal combustion engine may often use a piston assembly with at least one compression ring, a scraper ring and one oil ring. The blow-by phenomenon may be prevented by controlling the high-temperature and high-pressure exhaust gas generated in the combustion chamber by at least one compression ring included in the piston assembly during the stroke (compression, explosion, exhaust and suction strokes) of the internal combustion engine. However, the cylinder inner wall and the piston assembly are mechanisms for the reciprocating motion inside the cylinder, and thus the cylinder inner wall and the piston assembly may not maintain the complete air-tightness. Therefore, in case that the piston assembly includes two compression rings, about 85% of blow-by gas may be limited in the first compression ring, and about 70% of 15% of total blow-by gas leaked from the second compression ring, i.e. about 10.5% of the total blow-by gas, may be limited. Therefore, about 4.5% of the remaining blow-by gas is required to be limited by the remaining oil ring of the piston assembly. However, the oil ring has a smaller area in contact with the cylinder inner wall than the compression ring, and may thus limit only about 30% of the blow-by gas which is not air-tightened by the two compression rings. That is, about 3% of the total blow-by gas may flow into the crankcase, and the high-temperature and high-pressure gas may thus increase a temperature inside the internal combustion engine, resulting in the reduced efficiency of the internal combustion engine.

In addition, the oil ring has the small area in contact with the cylinder inner wall, the cylinder inner wall may thus be damaged by vibration or external shock occurring in the mechanism such as a car in which the internal combustion engine is placed, or by the reciprocating motion at high speed, which may continually lead to wear of an outer peripheral surface of the oil ring or wear of the cylinder inner wall. Metal debris produced by the wear of the oil ring and the cylinder may accelerate wear of the internal combustion engine. Furthermore, due to the oil leaked into the combustion chamber through a gap between the worn oil ring and cylinder, the fuel-air mixture and the engine oil supplied to the combustion chamber may be incompletely combusted, resulting in the reduced efficiency of the internal combustion engine.

Furthermore, the piston assembly may form an oil ring groove and have an oil ring mounted therein to control the oil. The engine oil oversupplied to the cylinder inner wall may be scraped off by the oil ring and discharged to an oil supply hole placed in the oil ring groove for discharging the engine oil to the crankcase. However, in case that the oil supply hole is placed in the oil ring groove, oil may flow back through the oil supply hole and through an oil drain hole due to high pressure generated in the internal combustion engine.

Therefore, there is a need to develop an oil ring for an internal combustion engine, which easily controls oil for the high-compression internal combustion engine, easily blocks the blow-by gas and has high-durability, and a piston assembly including the same.

DISCLOSURE

Technical Problem

An object of the present disclosure is to provide an oil ring for an internal combustion engine, which may reduce a blow-by phenomenon in which high-temperature and high-pressure exhaust gas generated in a combustion chamber of the internal combustion engine flows into the internal combustion engine; easily control engine oil supplied to a cylinder inner wall of the internal combustion engine and reduce wear of the cylinder inner wall and the oil ring; and reduce a phenomenon in which the oil flows back through an oil supply hole formed in a piston assembly due to pressure in the internal combustion engine, and the piston assembly including the same.

Technical Solution

In one general aspect, an oil ring for an internal combustion engine, mounted in a ring groove formed in a piston assembly and having an outer peripheral surface slidably coupled to a cylinder inner wall, the oil ring for an internal combustion engine includes: a ring-shaped body; a compression portion protruding from an upper portion of the body and in close contact with the cylinder inner wall; a scraper portion protruding from a lower portion of the body and in close contact with the cylinder inner wall; and an oil suction portion being a space formed between the compression portion and the scraper portion to collect and discharge the oil into the body.

In addition, the compression portion may include: a compression portion outer peripheral surface in close contact with and slidably coupled to the cylinder inner wall to face a direction of a cylinder liner; a compression portion first surface connected to an upper portion of the compression portion outer peripheral surface to face a direction toward a combustion chamber; a compression portion second surface connected to a lower portion of the compression portion outer peripheral surface to face a direction toward a crankcase; and a compression portion curved portion connected to a lower side of the compression portion outer peripheral surface, formed at a connection portion of the compression portion first surface and the compression portion outer peripheral surface and having a predetermined curve.

In addition, the scraper portion may include: a scraper portion outer peripheral surface in close contact with and slidably coupled to the cylinder inner wall to face the direction of the cylinder liner; a scraper portion first surface connected to an upper portion of the scraper portion outer peripheral surface to face a direction toward a combustion chamber; and a nose formed at a lower end of the scraper portion outer peripheral surface and in a protruding shape to scrape down the oil.

In addition, the scraper portion may further include: a hook extending from an end of the nose inward in a radial direction of the body and having a predetermined radius to temporarily store the oil scraped off from the cylinder inner wall by the nose and reduce a pressure of the oil; and a scraper portion second surface formed at the same level as that of a position of the nose or at a lower level than that of the position of the nose to face the direction toward the crankcase.

In addition, the oil suction portion may include: an oil passage surface spaced apart from the cylinder inner wall and collecting the oil scraped off from the cylinder inner wall; and a plurality of oil holes arranged on the oil passage surface and passing through the body in the radial direction of the body.

In addition, the oil suction portion may further include oil suction portion curved portions formed at portions where a lower surface of the compression portion and an upper surface of the scraper portion extend in the radial direction of the body, respectively, to be connected to the oil passage surface, having a predetermined curve and a protruding shape.

In addition, the oil suction portion may further include an expander formed on an inner peripheral surface of the body and made of an elastic member providing tension in a direction toward the cylinder inner wall.

In addition, an area in which the compression portion is in close contact with the cylinder inner wall is larger than an area in which the scraper portion is in close contact with the cylinder inner wall.

In addition, a length L1 of the compression portion may be formed 0.25 to 0.35 times a length L of the oil ring for an internal combustion engine.

In addition, a length L2 of the scraper portion outer peripheral surface may be formed 0.28 to 0.38 times the length L of the oil ring for an internal combustion engine.

In addition, the oil ring for an internal combustion engine may further include a wear-resistant reinforcement layer formed on the outer peripheral surface of the oil ring for an internal combustion engine and having Vickers hardness HV495 to HV855, the outer peripheral surface being slidably coupled to the cylinder inner wall.

In addition, the wear-resistant reinforcement layer may have a thickness D1 formed that is 0.07 to 0.13 times the length L of the oil ring for an internal combustion engine.

In another general aspect, a piston assembly mounted in a cylinder of an internal combustion engine and in close contact with and slidably coupled to a cylinder inner wall, the piston assembly includes: the oil ring for an internal combustion engine described above mounted in a piston ring groove at the lowermost end in a direction toward a crankcase among a plurality of piston ring grooves formed in the piston assembly; and an oil supply hole formed below the piston ring groove in which the oil ring for an internal combustion engine is mounted in the direction toward the crankcase, and passing through the piston assembly.

In addition, one end of the oil supply hole may be placed at a position spaced apart inwardly from an inner peripheral distal end of the hook of the scraper portion by a predetermined interval, and inclined downward in a direction toward an inside of the piston.

Advantageous Effects

The oil ring for an internal combustion engine and the piston assembly including the same according to the present disclosure integrates the functions of the compression ring, oil ring and scraper ring mounted on the conventional piston assembly into the one oil ring, thereby having a higher rate of blocking the blow-by gas based on the area increased than the area where the cylinder inner wall and the conventional oil ring are in contact with each other, easily managing the heat in the internal combustion engine and alleviating the phenomenon in which the conventional oil ring damages the cylinder inner wall. In addition, the piston assembly of the present disclosure includes the oil ring and forms the oil supply hole below the oil ring groove in which the oil ring is mounted, thereby preventing the oil from flowing back by the pressure in the internal combustion engine and easily discharging the oil oversupplied to the cylinder inner wall through the oil ring of the internal combustion engine of the present disclosure.

BEST MODE

Figure 1:
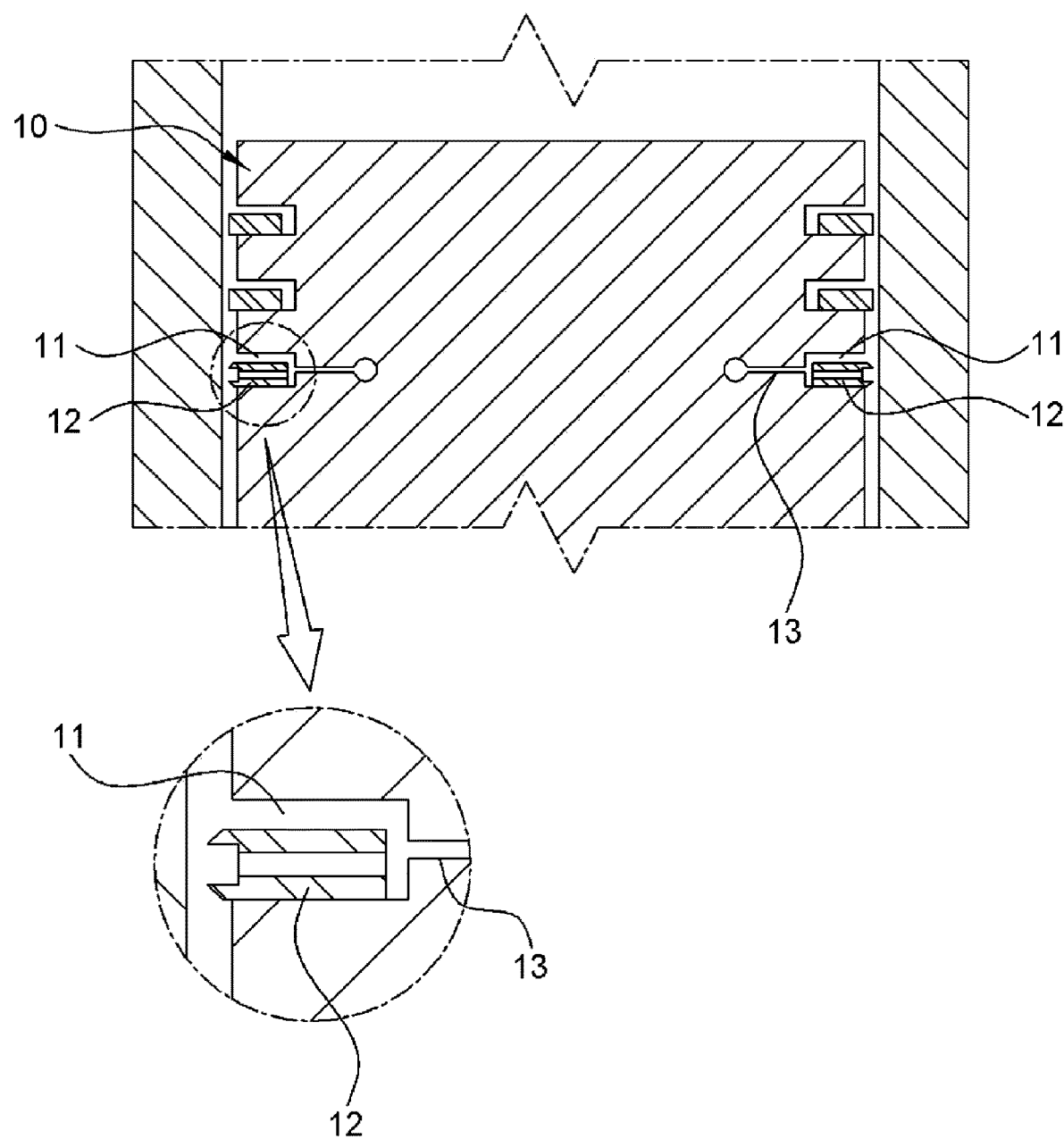
FIG. 1 is a cross-sectional view of a coupling of a conventional oil ring and a conventional piston assembly.

Hereinafter, the embodiments of the present disclosure will be described in detail with reference to accompanying drawings.

The accompanying drawings are only examples illustrated in order to describe the technical idea of the present disclosure in more detail. Therefore, the technical idea of the present disclosure is not limited to forms of the accompanying drawings.

Overall Configuration of Oil Ring for Internal Combustion Engine

An oil ring 1000 for an internal combustion engine and a piston assembly 2000 including the same according to the present disclosure are devices for increasing a blocking rate of oil and blow-by gas leaked between a cylinder inner wall and a conventional oil ring and for preventing a phenomenon in which oil flows back through an oil supply hole formed in a conventional piston assembly.

First, the oil ring 1000 for an internal combustion engine of the present disclosure includes: a ring-shaped body 100; a compression portion 200 protruding from an upper portion of the body and in close contact with the cylinder inner wall to increase air-tightness with the cylinder inner wall; a scraper portion 300 protruding from a lower portion of the body and in close contact with the cylinder inner wall to scrape off oil oversupplied to the cylinder inner wall; and an oil suction portion 400 formed between the compression portion 200 and the scraper portion 300 to collect and discharge the oil into the body. Next, the piston assembly 2000 of the present disclosure is characterized in easily controlling the oil by including: a plurality of ring grooves 600; the oil ring 1000 for an internal combustion engine mounted in the ring groove 600; and an oil through hole 700 formed below the ring groove 600 in which the oil ring 1000 for an internal combustion engine is mounted.

Figure 2:
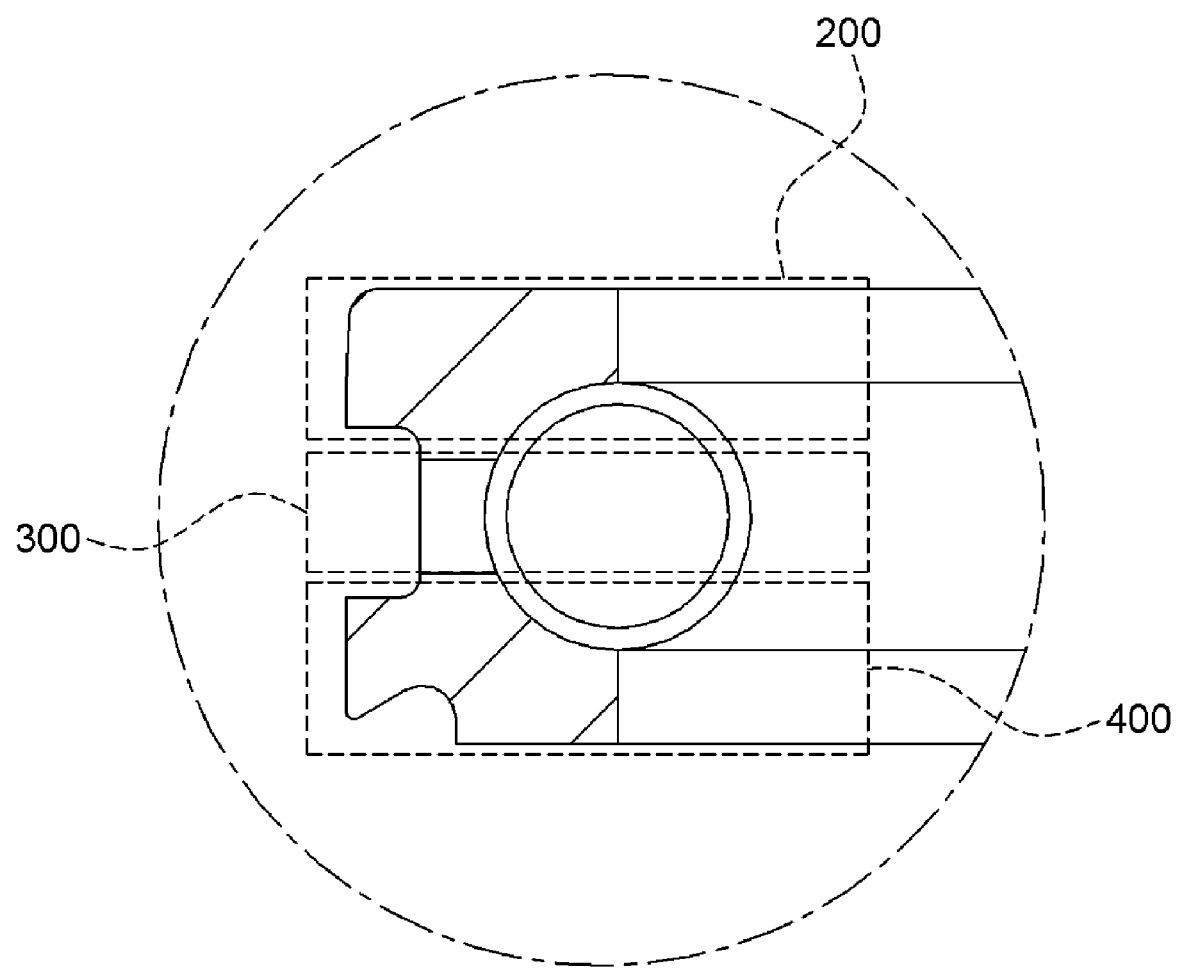
FIG. 2 is an enlarged cross-sectional view showing each portion of an oil ring for an internal combustion engine of the present disclosure.

As shown in FIG. 2, the oil ring 1000 for an internal combustion engine of the present disclosure may include the compression portion 200, the scraper portion 300 and the oil suction portion 400. Before the above is described, although not shown in FIG. 2, the oil ring 1000 for an internal combustion engine includes the ring-shaped body 100, and the body 100 may have a ring end cut at one side. In addition, the oil ring 1000 for an internal combustion engine according to one embodiment of the present disclosure describes the body 100 integrally formed. However, the oil ring 1000 for an internal combustion engine according to another embodiment of the present disclosure may be divided and disassembled into upper, lower and elastic members with respect to the oil suction portion 400. Each portion may be described in more detail as follows.

As shown in FIG. 2, the compression portion 200 may protrude from the upper portion of the body 100 and be in contact with and slidably coupled to the cylinder inner wall. The compression portion 200 may be in contact with the cylinder inner wall with a larger area than an upper outer peripheral surface of the conventional oil ring 13, thereby preventing the high-temperature and high-pressure blow-by gas generated in a combustion chamber of the internal combustion engine from being leaked into a crankcase. In addition, the compression portion 200 may be formed to prevent a phenomenon in which the oil oversupplied to the cylinder inner wall is leaked to an upper portion of the oil ring for an internal combustion engine and, finally leaked to the combustion chamber of the internal combustion engine, and the leaked oil is mixed with a fuel-air mixture supplied to the combustion chamber to be incompletely combusted.

The scraper portion 300 may protrude from the lower portion of the body 100 and be in close contact with and slidably coupled to the cylinder inner wall. Therefore, the scraper portion 300 may block the oil and gas similarly to the compression portion 200. In addition, a protrusion protruding from a lower end of the scraper portion 300 may be formed to scrape off oil oversupplied to the cylinder inner wall of the scraper portion 300 and easily guide the oil in a direction toward the crankcase.

The oil suction portion 400 may be a space spaced apart from the cylinder inner wall and formed between the compression portion 200 and the scraper portion 300, and may be formed in a shape to collect the oil oversupplied to the cylinder inner wall and easily discharge the oil into the body 100. In addition, the elastic member may be mounted on an inner peripheral surface of the body 100 to provide tension so that the oil ring 1000 for an internal combustion engine is in close contact with the cylinder inner wall.

Figure 3:
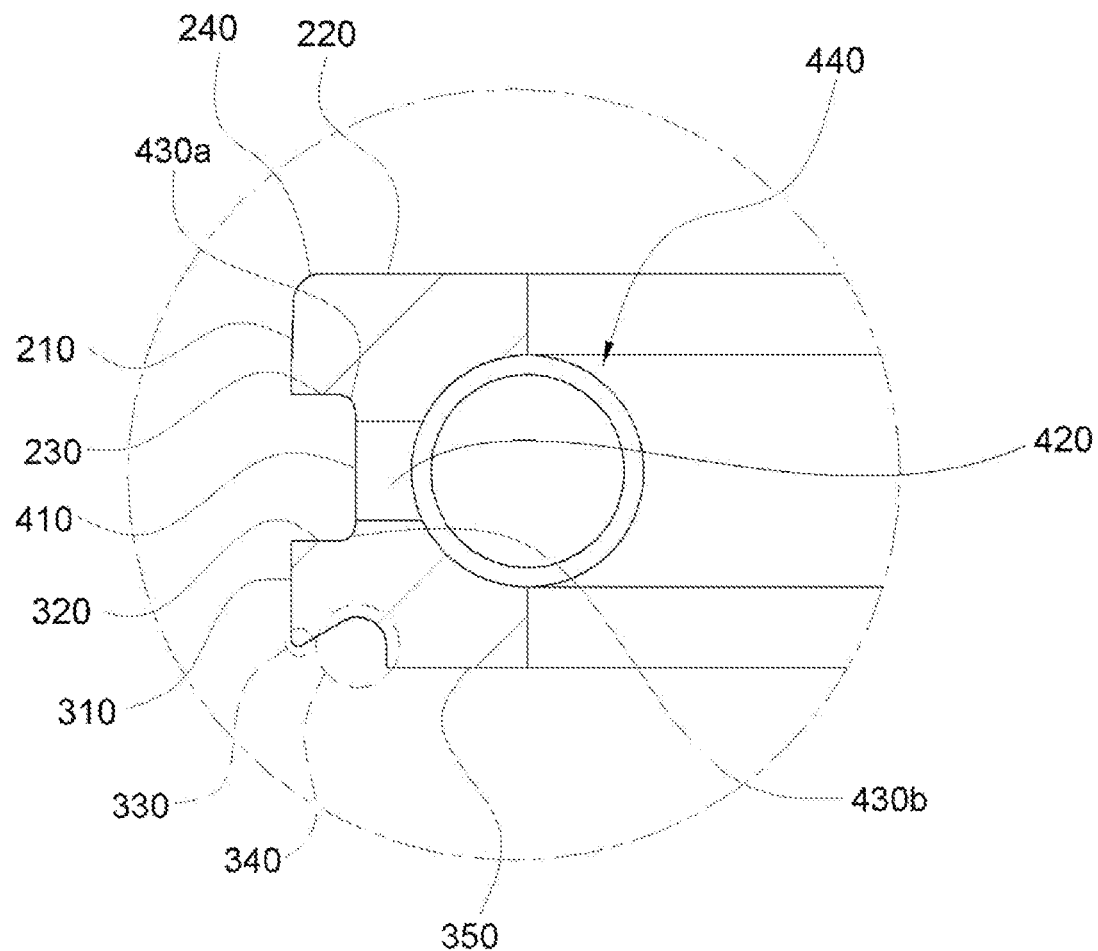
FIG. 3 is a detailed enlarged cross-sectional view showing components of each portion of an oil ring for an internal combustion engine of the present disclosure.

As shown in FIG. 3, the compression portion 200 of the oil ring 1000 for an internal combustion engine of the present disclosure may include: a compression portion outer peripheral surface 210; a compression portion first surface 220; a compression portion second surface 230; and a compression portion curved portion 240. Each component may be described in more detail as follows.

The compression portion outer peripheral surface 210 may be in close contact with and slidably coupled to the cylinder inner wall of the internal combustion engine in the upper portion of the oil ring 1000 for an internal combustion engine. Accordingly, the blow-by gas formed in the combustion chamber of the internal combustion engine and leaked in the direction toward the crankcase may be limited through the compression portion outer peripheral surface 210 having a larger area in contact with the cylinder inner wall than that of the conventional oil ring 12. Therefore, the oil ring 1000 of the present disclosure may more easily block the blow-by gas and the oil than the conventional oil ring 12. High durability provided by the larger area of the compression portion outer peripheral surface 210 may prevent a phenomenon in which a piston having a conventional oil ring 12 mounted thereon and having a reciprocating motion in the internal combustion engine damages the inside of the cylinder. In addition, the compression portion outer peripheral surface 210 may provide an area through which heat generated by explosive gas formed in the combustion chamber of the internal combustion engine may be easily transferred to the cylinder inner wall and thus transferred to a coolant circulating in the internal combustion engine. Therefore, the compression portion 100 may be structurally formed by connecting the compression portion first surface 220 connected to an upper portion of the compression portion outer peripheral surface 210 to face a direction toward the combustion chamber and extending in a radial direction of the body 100 with the compression portion second surface 230 connected to a lower portion of the compression portion outer peripheral surface 210 to face the direction toward the crankcase and extending in the radial direction of the body 100.

The compression portion first surface 220 may be formed to be parallel to an upper surface of the ring groove to block the leakage of the high-temperature and high-pressure blow-by gas and the oil generated in the combustion chamber during a downward stroke in which the piston is moved down to the combustion chamber by being in close contact with an area in the direction toward the combustion chamber of the ring groove in which a piston ring for the internal combustion engine is mounted.

The compression portion second surface 230 only needs to guide the oil oversupplied to the cylinder inner wall from the lower portion of the compression portion outer peripheral surface 210 to the oil suction portion 300 of the oil ring 1000 for an internal combustion engine. Therefore, the compression portion second surface 230 may generally be formed to face the direction toward the crankcase, and is not limited to the embodiment shown in FIG. 3 only.

In addition, the oil ring 1000 for an internal combustion engine of the present disclosure may require plating and other heat treatment to enhance wear resistance of its outer peripheral surface. The plating process of the oil ring 1000 for an internal combustion engine may be performed by stacking the plurality of oil rings 1000 for the internal combustion engine. Therefore, if there is no space spaced from each other between the plurality of rings by the compression portion curved portion 240, a metal used in the plating process of the stacked piston rings 1000 for the internal combustion engine may interfere with a gap between the plurality of oil rings 1000 for the internal combustion engine, which may require a post-processing process. Therefore, the compression portion curved portion 240 protruding from a connection portion of the compression portion outer peripheral surface 210 and the compression portion first surface 220 and having a curved shape may be formed to prevent such interference, and thus the post-processing process may not be required.

The scraper portion 300 of the oil ring 1000 for an internal combustion engine may include: a scraper portion outer peripheral surface 310; a scraper portion first surface 320; a nose 330; a hook 340; and a scraper portion second surface 350. Each component may be described in more detail as follows.

The scraper portion outer peripheral surface 310 may be in close contact with and slidably coupled to the cylinder inner wall of the internal combustion engine at a lower portion of the oil ring 1000 for an internal combustion engine. Accordingly, the blow-by gas formed in the combustion chamber of the internal combustion engine and leaked in the direction toward the crankcase may be limited through the scraper portion outer peripheral surface 310. In addition, an area of the scraper portion outer peripheral surface 310 in contact with the cylinder inner wall may be larger than an area of a lower portion of the conventional oil ring 12 in close contact with the cylinder inner wall, thereby preventing the phenomenon in which the piston assembly having the conventional oil ring mounted thereon damages the inside of the cylinder. Therefore, structurally, the scraper portion first surface extending in the radial direction of the body 100 may be formed at an upper end of the scraper portion outer peripheral surface 310, and the nose 330 may be formed in a protruding shape at a lower end of the scraper portion outer peripheral surface 310 to simply and easily scratch off and collect the oil oversupplied to the cylinder inner wall and discharge the oil into the crankcase.

To describe the nose 330 in more detail, the nose 330 may protrude from a longitudinal end where the scraper portion outer peripheral surface 310 is in close contact with the cylinder inner wall in the direction toward the crankcase and be formed in a shape of a protrusion having a small radius, thereby easily scraping off the oil oversupplied to the cylinder inner wall.

The hook 340 may be formed in a space with a certain radius in a portion where the nose 330 extends inward in a radial direction of the oil ring 1000 for an internal combustion engine, and may serve as a flow passage to guide the oil scraped off by the nose 330 and serve to reduce a pressure of the oil by temporarily storing the high-pressure oil.

The scraper portion second surface 350 may be connected to the hook 340, and may be formed at the same level as a position of the lowermost end of the nose 330 or at a lower level than that of the lowermost end of the nose 330 to face the direction toward the crankcase. The scraper portion second surface 350 may be formed to be parallel to a lower surface of the ring groove to block the leakage of the high-temperature and high-pressure blow-by gas and the oil generated in the combustion chamber during an upward stroke in which the piston is moved up to the combustion chamber by being in close contact with an area in the direction toward the crankcase of the ring groove in which the piston ring for the internal combustion engine is mounted.

The oil suction portion 400 of the oil ring 1000 for an internal combustion engine may include: an oil passage surface 410; an oil hole 420; oil hole curved portions 430a and 430b; and an expander 440. Each component may be described in more detail as follows.

The oil passage surface 410 may be a space formed between the compression portion 200 and the scraper portion 300 and spaced apart from the cylinder inner wall, and may serve as a flow passage for the oil oversupplied to the cylinder inner wall by guiding the oversupplied oil to the oil hole 420.

The one or plurality of oil holes 420 may be formed to pass through the body 100 along the oil passage surface 410, and may be arranged in a radial direction of the body. The oil collected from the oil passage surface 410 may be guided into the body 100 through the oil hole 420.

The oil hole curved portions 430a and 430b may each be formed to have a predetermined curve and a shape protruding from a connection between the compression portion second surface 230 or the scraper portion first surface 320 and the oil suction portion 400, which is a portion where a lower portion of the compression portion 200 or an upper portion of the scraper portion 300 extends in a direction of the body 100. The oil collected on the oil passage surface 410 may include a hydrocarbon complex produced by incomplete combustion of the oil and the fuel-air mixture supplied to the engine combustion chamber or a stack in which metal debris from wear of the cylinder inner wall and the like are combined with the oil. The oil hole curved portions 430a and 430b may thus be formed in a curved shape to allow such impurities to be discharged together with the oil when the oil flows into the oil hole 420.

The expander 440 may be formed on an inner peripheral surface of the body 100 having a ring shape to provide a predetermined pressure in a direction toward the cylinder inner wall, thereby serving to bring the oil ring 1000 for an internal combustion engine into closer contact with the cylinder inner wall. The expander 440 may be formed of a coil spring having elasticity to bring the oil ring 1000 for an internal combustion engine into closer contact with the cylinder inner wall.

Specific Technical Feature of Oil Ring for Internal Combustion Engine

In order for the oil ring 1000 for an internal combustion engine of the present disclosure to perform all of the functions of a compression ring, the oil ring, and a scraper ring, when L refers to an overall thickness, i.e. an axial length of the oil ring for an internal combustion engine, each length of the compression portion 200, the scraper portion 300, the scraper portion outer peripheral surface 310 and the like needs to be set within a specific range.

Figure 4:
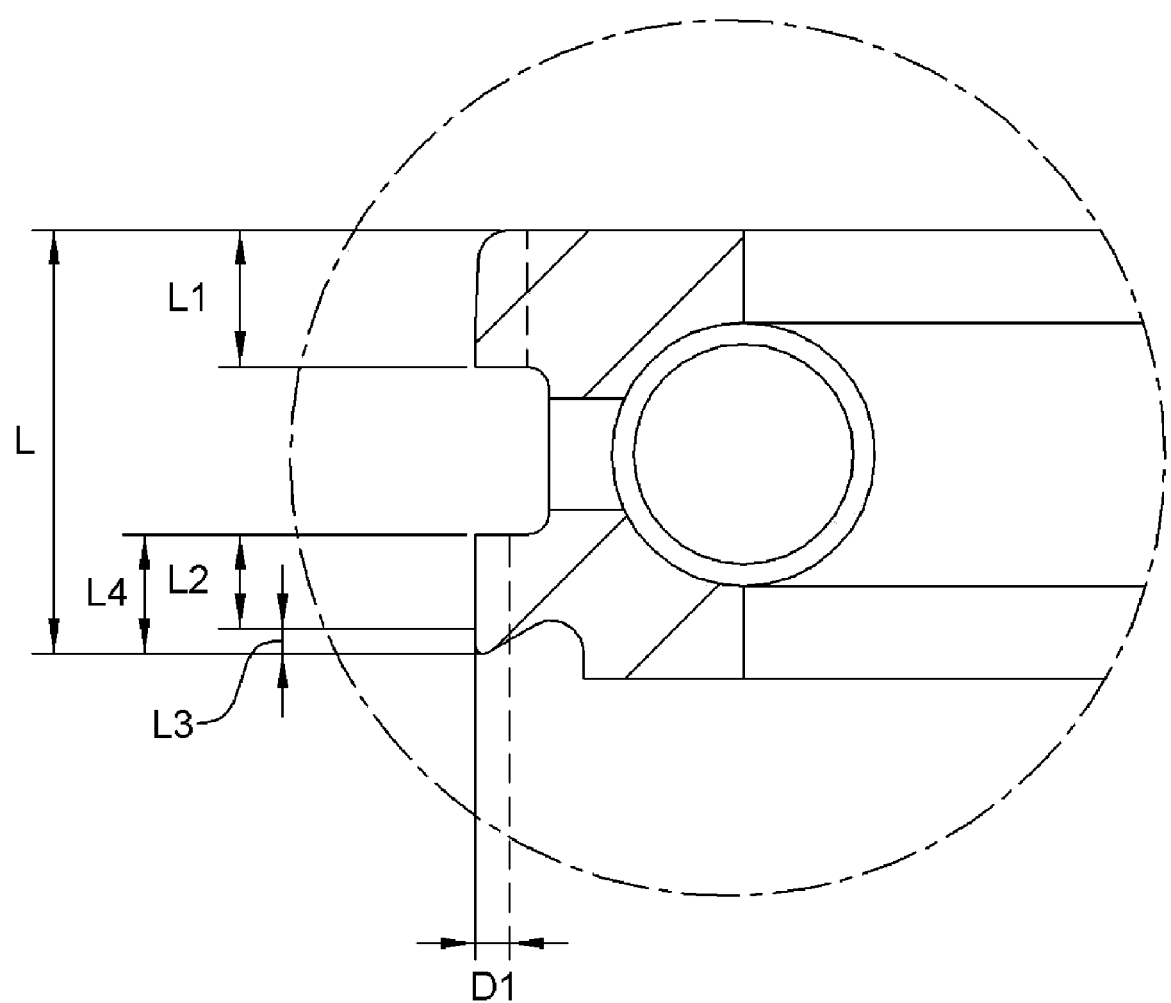
FIG. 4 is a cross-sectional view providing a parameter of an oil ring for an internal combustion engine of the present disclosure.

As shown in FIG. 4, L1 refers to the length of the compression portion 200 and may represent a distance between the compression portion first surface 220 and the compression portion second surface 230; L2 refers to the length of the scraper portion 300 and may represent a distance between the scraper portion first surface 320 and the scraper portion second surface 350; and the length L2 of the scraper portion 300 may be represented as the sum of the length L2 of the scraper portion outer peripheral surface 310 and the distance L3 between the nose 330 and the scraper portion second surface 350.

As described above, to limit the high-temperature and high-pressure exhaust gas generated in the combustion chamber more than the conventional oil ring 12, and to efficiently discharge the heat of the high temperature in the internal combustion engine, the oil ring 1000 for an internal combustion engine of the present disclosure needs to allow the length L1 of the compression portion 200 and the length L2 of the scraper portion outer peripheral surface 310 in close contact with the internal combustion engine cylinder to be properly designed. As the length L1 of the compression portion 200 and the length L2 of the scraper portion outer peripheral surface 310 are longer, it may be easier to discharge the heat and control the oil in the internal combustion engine. To the contrary, during a stroke of the internal combustion engine, such a long length may increase friction between the oil ring 1000 for an internal combustion engine and the cylinder inner wall, resulting in reduced efficiency of the internal combustion engine. Therefore, the length L1 of the compression portion 200 into which the more high-temperature and high-pressure exhaust gas generated in the combustion chamber may flow than the scraper portion 300 may preferably be formed 0.2 to 0.4 times the length L of the oil ring for an internal combustion engine, and more preferably be 0.25 to 0.35 times. Meanwhile, the length L3 of the scraper portion outer peripheral surface may be formed to be smaller than the length L1 of the compression portion 200. The length L3 may preferably be formed 0.2 to 0.3 times the length L of the oil ring for an internal combustion engine, and more preferably be 0.22 to 0.28 times.

In addition, the distance L3 between the lowermost end of the nose 330 and the scraper portion second surface needs to be designed to a length allowing easy insertion of a cutting tool for a process when manufacturing the nose 330 and hook 340. Therefore, the distance L3 between the lowermost end of the nose 330 and the scraper portion second surface 350 may be formed to form a step with the scraper portion second surface 350. The distance L3 may preferably be formed 0.03 to 0.13 times the length L of the oil ring for an internal combustion engine, and more preferably be 0.04 to 0.1 times.

Figure 5:
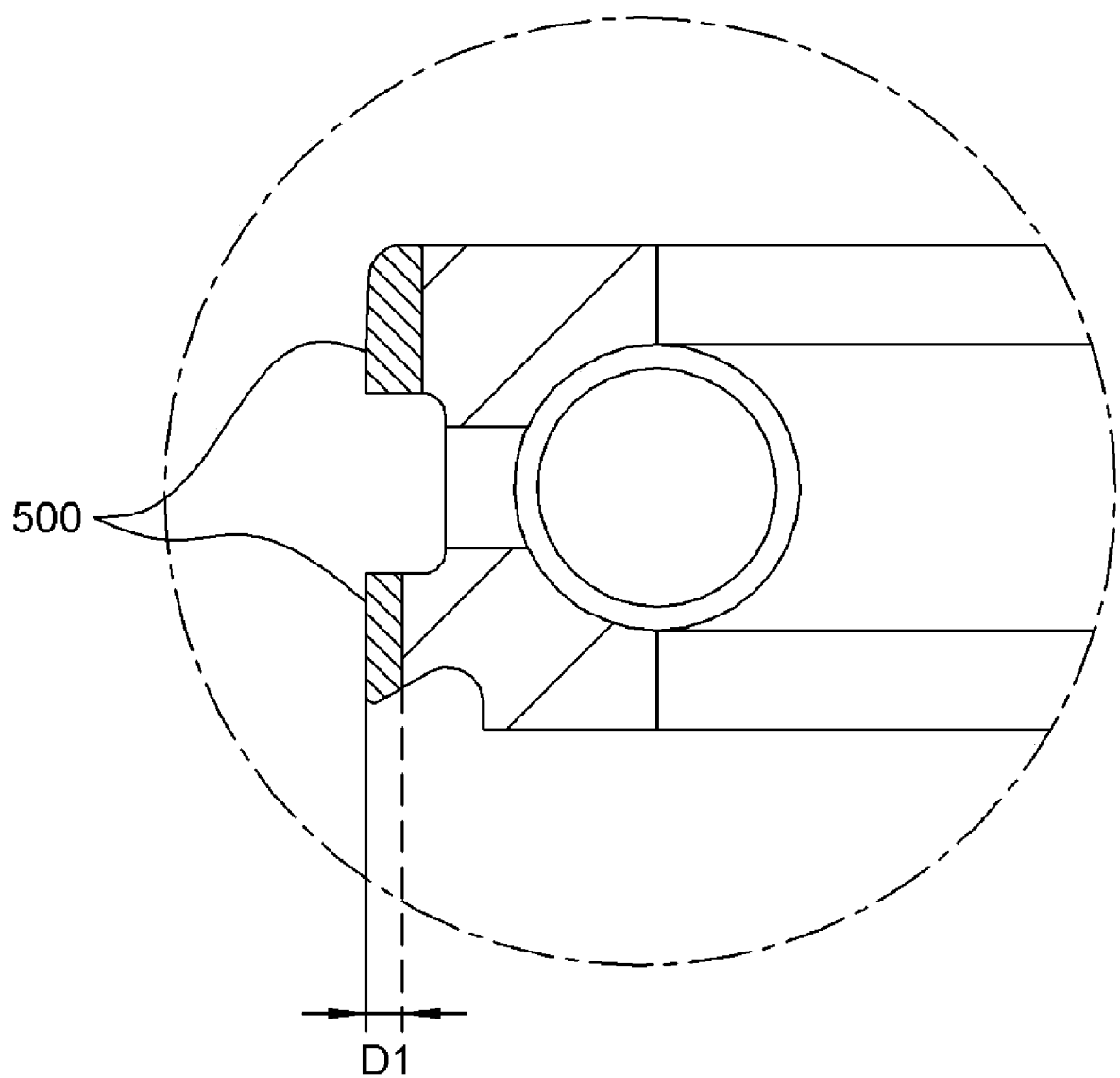
FIG. 5 is a cross-sectional view showing a modified embodiment of an oil ring for an internal combustion engine of the present disclosure.

As shown in FIG. 5, the oil ring 1000 for an internal combustion engine of the present disclosure may be exposed to a high-speed and high-pressure environment inside the cylinder of the internal combustion engine for a long time, and may thus cause wear of the oil ring 1000 for an internal combustion engine and wear of the cylinder inner wall due to the friction of the oil ring with the cylinder inner wall. Accordingly, the oil ring 1000 for an internal combustion engine needs to have a homogeneous contact surface which allows the oil ring to be smoothly moved inside the cylinder, and an outer peripheral surface with high wear resistance. A wear-resistant reinforcement layer 500 is illustrated in FIG. 5 showing a modified embodiment of the oil ring 1000 for an internal combustion engine. The wear-resistant reinforcement layer 500 may be formed through laser heat treatment. Through the laser heat treatment, the wear-resistant reinforcement layer 500 having Vickers hardness HV445 to HV885 may be formed at a portion where the oil ring 1000 for an internal combustion engine is in contact with the cylinder inner wall.

In addition, as shown in FIGS. 4 and 5, the wear-resistant reinforcement layer 500 may have a thickness D1 which may have Vickers hardness of the range from HV445 to HV885. The thickness D1 may preferably be formed 0.03 to 0.13 times the length L of the oil ring for an internal combustion engine, and more preferably be 0.04 to 0.1 times.

Figure 6:
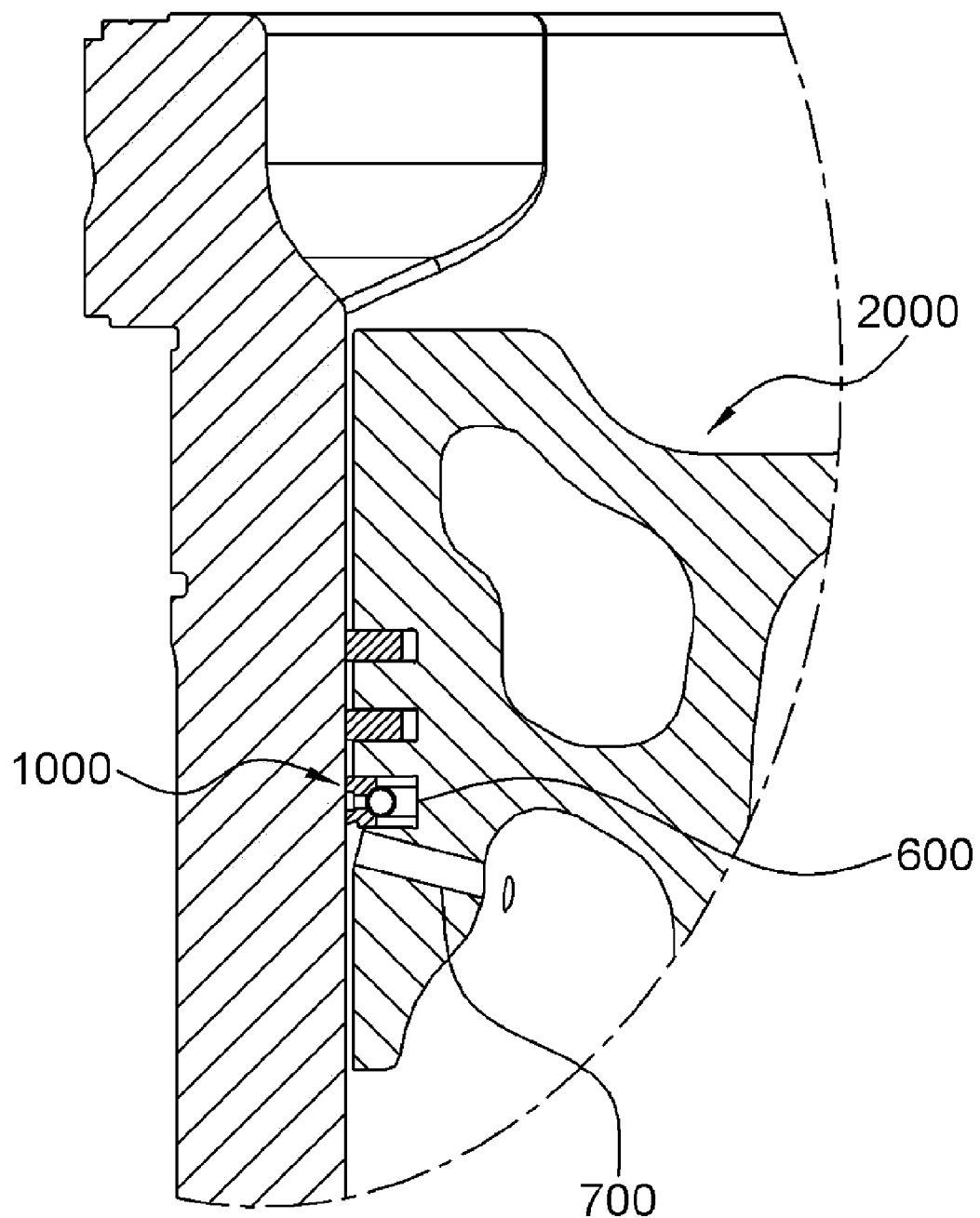
FIG. 6 is a cross-sectional view showing a coupled embodiment of an oil ring for an internal combustion engine of the present disclosure and a piston assembly including the same.

Overall Configuration of Piston Assembly Including Oil Ring for Internal Combustion Engine As shown in FIG. 6, the oil ring 1000 for an internal combustion engine and the piston assembly 2000 including the same according to the present disclosure may preferably be mounted in the cylinder of the internal combustion engine. The piston assembly 2000 may be formed to include: the ring grooves 600 in which a plurality of conventional piston rings are mounted; the oil ring 1000 for an internal combustion engine which is mounted in the ring groove 600 at the lowermost end in the direction toward the crankcase among the ring grooves 600; and the oil supply hole 700 which may easily guide and discharge scraped-off oil into the crankcase when the oil ring 1000 for an internal combustion engine scrapes off the oil oversupplied to the cylinder inner wall.

In addition, one end of the oil supply hole 700 may be placed at a position spaced apart inwardly from an inner peripheral distal end of the hook of the scraper portion by a predetermined interval, and inclined downward in a direction toward an inside of the piston. In particular, the oil supply hole 700 may be inclined downward in the direction toward the inside of the piston below the ring groove 600 in which the oil ring 1000 for an internal combustion engine is mounted, and thus easily discharge the oil guided to be collected in the piston ring 1000 for the internal combustion engine.

Figure 7:
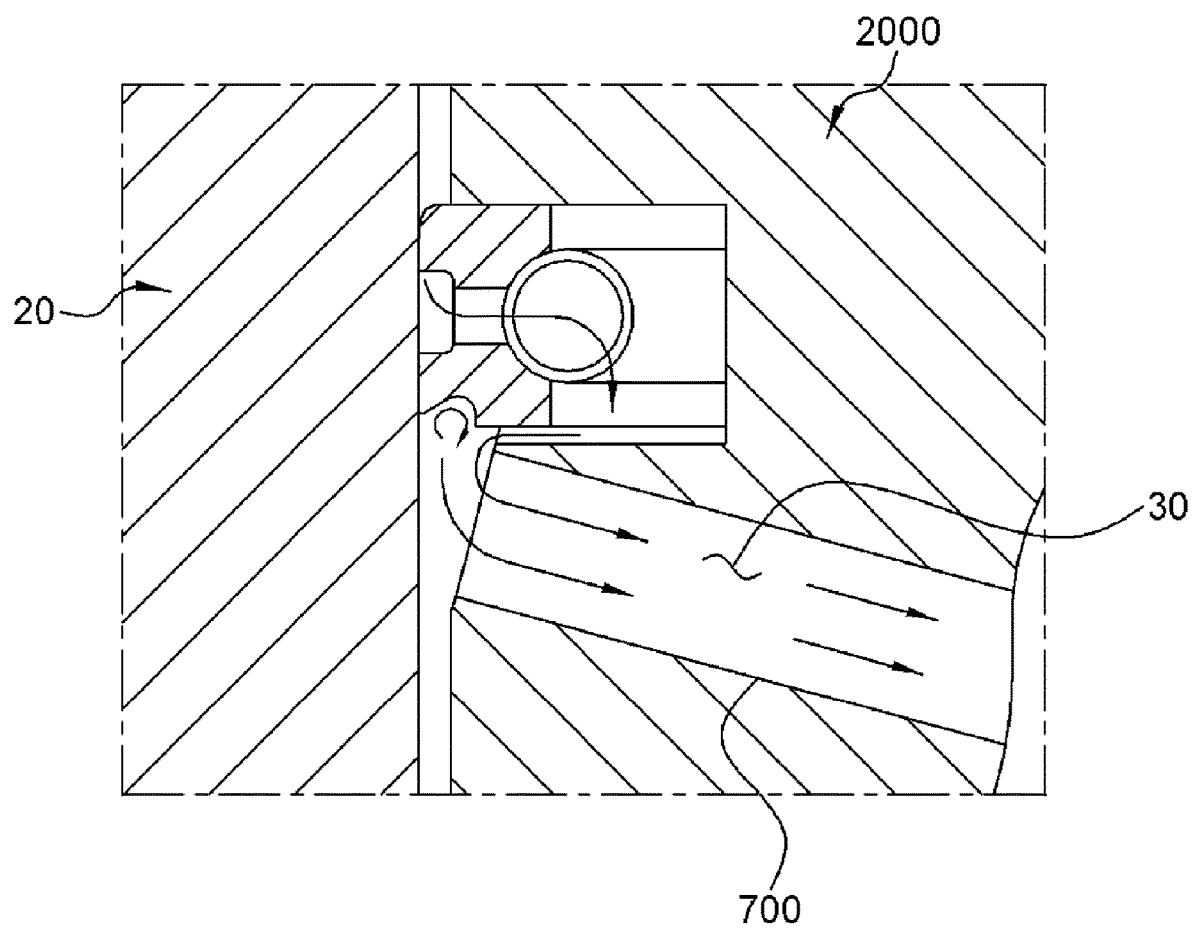
FIG. 7 is an oil flow diagram showing an oil flow during an upward stroke of an internal combustion engine according to a coupled embodiment of an oil ring for an internal combustion engine of the present disclosure and a piston assembly including the same.

As shown in FIG. 7, a flow of oil 30 during the downward stroke of the piston assembly 2000 may be observed differently in three positions based on a coupled embodiment of the oil ring 1000 for an internal combustion engine and the piston assembly 2000 including the same according to the present disclosure. The first is the flow of the oil 30 in an upper portion of the compression portion 200. In particular, the upper portion of the compression portion 200 may be sealed because the piston ring 1000 for the internal combustion engine and the ring groove 600 are in close contact with the cylinder inner wall in the direction toward the combustion chamber during the downward stroke of the piston assembly 2000. In addition, the piston assembly 2000 during the downward stroke may allow the oil 30 to be spread on the cylinder inner wall 20 by scraping off the oil 30 stacked in the upper portion of the compression portion 200 through inertia, and scraping down the oil 30 oversupplied through the other piston rings mounted above the oil ring 1000 for an internal combustion engine.

The second is the flow of the oil 30 in the oil suction portion 400. The compression portion second surface 230 connected to the oil suction portion 400 may scrape down the oil 30 oversupplied to the cylinder inner wall 20, collect the oil through the oil passage surface 410 and guide the oil to the oil hole 320, thereby guiding the oil 30 to a space formed between the inside of the piston ring 1000 for the internal combustion engine and the ring groove 600 to store the oil therein. In addition, the collected oil 30 may be discharged to a gap formed by the oil ring 1000 for an internal combustion engine that is spaced apart from a lower portion of the ring groove 600 by the inertia generated during the downward stroke of the piston assembly 2000.

The third is the flow of the oil 30 in a lower portion of the scraper portion 300. During the downward stroke of the piston assembly 2000, the oil 30 may be spread from the crankcase to a space between the cylinder inner wall 200 and the piston assembly 2000 by pressure of the internal combustion engine, and supplied to the lower portion of the scraper portion 300 and the cylinder inner wall 20. Among the oil 30, the oil 30 oversupplied to the cylinder inner wall and scraped off through the nose 330 may be guided to a radial inner extension line of the nose 33. The oil 30 may be redirected and temporarily stored in the hook 340 to have the reduced pressure temporarily and be guided to the oil supply hole 700. In addition, the oil 30 discharged to the gap formed in the lower portion of the ring groove 600 may be guided to the oil supply hole 700.

Figure 8:
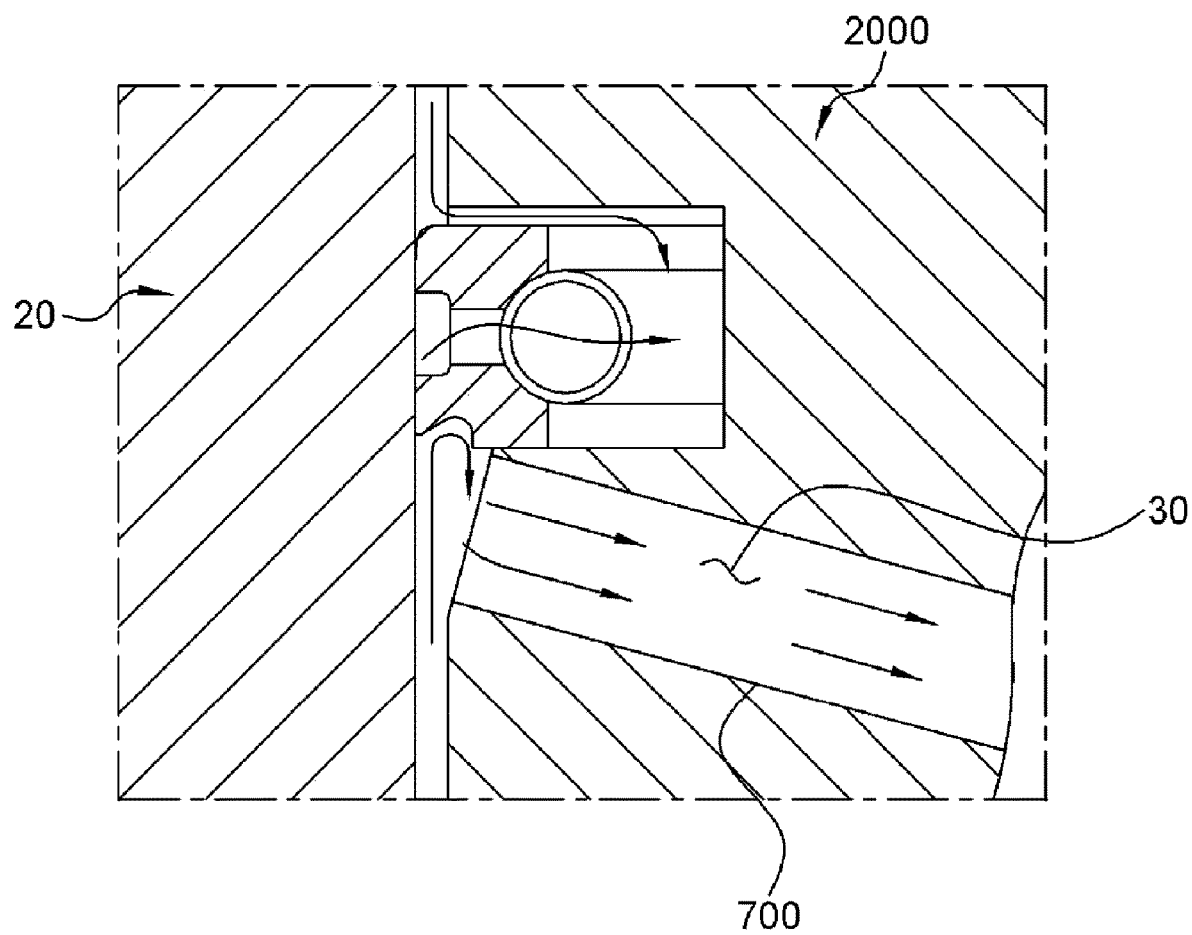
FIG. 8 is an oil flow diagram showing an oil flow during a downward stroke of an internal combustion engine according to a coupled embodiment of an oil ring for an internal combustion engine of the present disclosure and a piston assembly including the same.

As shown in FIG. 8, a flow of oil 30 during the upward stroke of the piston assembly 2000 may be observed differently in three positions based on the coupled embodiment of the oil ring 1000 for an internal combustion engine and the piston assembly 2000 including the same according to the present disclosure.

The first is the flow of the oil 30 in the upper portion of the compression portion 200. During the upward stroke of the piston assembly 2000, a gap may be formed in the upper portion of the compression portion 200 because the piston ring 1000 for the internal combustion engine is spaced apart at a predetermined interval from the ring groove 600 in which the piston ring 1000 is mounted. The piston assembly 2000 during the upward stroke may form an oil film by allowing the oil 30 stacked in the upper portion of the compression portion 200 in the direction toward the combustion chamber to thinly spread on the cylinder inner wall 20, and may guide the oil 30 remaining after forming the oil film to the space formed between the piston ring 1000 for the internal combustion engine and the ring groove 600 through the gap.

The second is the flow of the oil 30 in the oil suction portion 400. The scraper portion first surface 320 connected to the oil suction portion 400 may scrape up the oil 30 oversupplied to the cylinder inner wall 20 to form the thin oil film on the cylinder inner wall 20, and may guide the oil 30 collected through the oil passage surface 410 to the oil hole 320 and temporarily store the oil 30 in the space formed between the inside of the piston ring 1000 for the internal combustion engine and the ring groove 600. In addition, the oil 30 collected by the inertia generated during the upward stroke of the piston assembly 2000 may be discharged to a gap formed to be spaced apart from an upper portion of the ring groove 600 in the direction toward the combustion chamber, thereby blocking the blow-by gas phenomenon in which the oil 30 stored in the space formed between the piston ring 1000 for the internal combustion engine and the ring groove 600 is leaked to the combustion chamber of the internal combustion engine and the blow-by gas flows into the gap.

The third is the flow of the oil 30 in the lower portion of the scraper portion 300. The ring groove 600 in which the piston ring 1000 for the internal combustion engine is mounted, the inner wall in the direction toward the crankcase and the lower portion of the scraper portion 300 may be sealed during the upward stroke of the piston assembly 2000. Therefore, it is possible to block the oil 30 which may flow back through the oil through hole 700 or the crankcase, and guide the oil 30 to the crankcase or the oil through hole 700 again to be discharged through the scraper portion 300.

The present disclosure may be variously modified and have several exemplary embodiments. Therefore, specific exemplary embodiments of the present disclosure are illustrated in the accompanying drawings and be described in detail. However, it is to be understood that the present disclosure is not limited to a specific exemplary embodiment, but includes all modifications, equivalents, and substitutions without departing from the scope and spirit of the present disclosure.

It is to be understood that when one element is referred to as being "connected to" or "coupled to" another element, it may be connected directly to or coupled directly to another element or be connected to or coupled to another element, having the other element intervening therebetween.

Unless defined otherwise, it is to be understood that all the terms used in the present specification including technical and scientific terms have the same meanings as those that are generally understood by those skilled in the art.

It is to be understood that the terms defined by the dictionary are identical with the meanings within the context of the related art, and they should not be ideally or excessively formally defined unless the context clearly dictates otherwise. Technical terms and scientific terms used in the present specification have the general meaning understood by those skilled in the art to which the present disclosure pertains unless otherwise defined, and a description for the known function and configuration unnecessarily obscuring the gist of the present disclosure is omitted in the following description and the accompanying drawings.

The present disclosure is not limited to the abovementioned exemplary embodiment, but may be variously applied, and may be variously modified without departing from the gist of the present disclosure claimed in the claims.

The invention claimed is:

1. An oil ring for an internal combustion engine, mounted in a ring groove formed in a piston assembly and having an outer peripheral surface slidably coupled to a cylinder inner wall, the oil ring for an internal combustion engine comprising:
   a ring-shaped body;
   a compression portion protruding from an upper portion of the body and in close contact with the cylinder inner wall;
   a scraper portion protruding from a lower portion of the body and in close contact with the cylinder inner wall;
   an oil suction portion being a space formed between the compression portion and the scraper portion to collect and discharge oil into the body; and
   a wear-resistant reinforcement layer formed on the outer peripheral surface of the oil ring for an internal combustion engine, the outer peripheral surface being slidably coupled to the cylinder inner wall;
   wherein the compression portion includes:
   a compression portion outer peripheral surface in close contact with and slidably coupled to the cylinder inner wall for facing toward a cylinder liner;
   a compression portion first surface connected to an upper portion of the compression portion outer peripheral surface for facing toward a combustion chamber;
   a compression portion second surface connected to a lower portion of the compression portion outer peripheral surface for facing toward a crankcase; and
   a compression portion curved portion formed at a connection portion of the compression portion first surface and the compression portion outer peripheral surface and having a predetermined curve, and
   the compression portion curved portion has a thickness smaller than that of the wear-resistant reinforcement layer to be formed in a region where the wear-resistant reinforcement layer is formed.

2. The oil ring for an internal combustion engine of claim 1, wherein the scraper portion includes:
   a scraper portion outer peripheral surface in close contact with and slidably coupled to the cylinder inner wall for facing toward the cylinder liner;
   a scraper portion first surface connected to an upper portion of the scraper portion outer peripheral surface for facing toward the combustion chamber; and
   a scraper nose formed at a lower end of the scraper portion outer peripheral surface and in a protruding shape to scrape down the oil.

3. The oil ring for an internal combustion engine of claim 2, wherein the scraper portion further includes:
   a hook extending from an end of the nose inward in a radial direction of the body and having a predetermined radius to temporarily store the oil scraped off from the cylinder inner wall by the nose and reduce a pressure of the oil; and
   a scraper portion second surface formed at the same level as that of a position of the nose or at a lower level than that of the position of the nose to face the direction toward the crankcase.

4. The oil ring for an internal combustion engine of claim 1, wherein the oil suction portion includes:
   an oil passage surface spaced apart from the cylinder inner wall and capable of collecting oil scraped off from the cylinder inner wall; and
   a plurality of oil holes arranged on the oil passage surface and passing through the body in a radial direction of the body.

5. The oil ring for an internal combustion engine of claim 4, wherein the oil suction portion further includes oil suction portion curved portions formed at portions where a lower surface of the compression portion and an upper surface of the scraper portion extend in the radial direction of the body, respectively, to be connected to the oil passage surface, having a predetermined curve and a protruding shape.

6. The oil ring for an internal combustion engine of claim 4, wherein the oil suction portion further includes an expander formed on an inner peripheral surface of the body and made of an elastic member providing tension in a direction toward the cylinder inner wall.

7. The oil ring for an internal combustion engine of claim 1, wherein an area in which the compression portion is in close contact with the cylinder inner wall is larger than an area in which the scraper portion is in close contact with the cylinder inner wall.

8. The oil ring for an internal combustion engine of claim 1, wherein a length L1 of the compression portion is formed 0.2 to 0.4 times a length L of the oil ring for an internal combustion engine.

9. The oil ring for an internal combustion engine of claim 2, wherein a length L2 of the scraper portion outer peripheral surface is formed 0.2 to 0.3 times a length L of the oil ring for an internal combustion engine.

10. The oil ring for an internal combustion engine of claim 1, the wear-resistant reinforcement layer having Vickers hardness HV495 to HV855.

11. The oil ring for an internal combustion engine of claim 10, wherein the wear-resistant reinforcement layer has a thickness D1 that is formed 0.03 to 0.13 times a length L of the oil ring for an internal combustion engine.

12. A piston assembly mounted in a cylinder of an internal combustion engine and in close contact with and slidably coupled to a cylinder inner wall, the piston assembly comprising:
   the oil ring for an internal combustion engine of claim 1 mounted in a piston ring groove formed at a lowermost end in a direction toward a crankcase among a plurality of piston ring grooves formed in the piston assembly; and
   an oil supply hole formed below the piston ring groove in which the oil ring for an internal combustion engine is mounted in the direction toward the crankcase, and passing through the piston assembly.

13. The piston assembly of claim 12, wherein one end of the oil supply hole is placed at a position spaced apart inwardly from an inner peripheral distal end of a hook of the scraper portion by a predetermined interval, and inclined downward in a direction toward an inside of the piston.

* * * * *